United States Patent [19]
Sawdy

[11] Patent Number: 5,937,706
[45] Date of Patent: Aug. 17, 1999

[54] CARRIAGE ADAPTED TO BE SLIDABLY MOUNTED ON A TRACK

[75] Inventor: Michael Barry Sawdy, Colliers, Nr. Ware, United Kingdom

[73] Assignee: NMI Safety Systems Limited, London, United Kingdom

[21] Appl. No.: 08/888,908

[22] Filed: Jul. 7, 1997

[30] Foreign Application Priority Data

Jul. 10, 1996 [GB] United Kingdom .................. 9614642

[51] Int. Cl.⁶ ............................ G05G 5/06; F16M 13/00; A47C 1/02
[52] U.S. Cl. ........................ 74/531; 248/429; 297/344.1
[58] Field of Search ........................ 74/531; 297/344.1; 248/429, 503, 430

[56] References Cited

U.S. PATENT DOCUMENTS

| | | | |
|---|---|---|---|
| 3,189,313 | 6/1965 | Burns et al. ............................ | 248/429 |
| 3,652,050 | 3/1972 | Marrujo et al. ....................... | 297/344.1 |
| 3,847,344 | 11/1974 | Kulczycki et al. ..................... | 248/503 |
| 4,658,669 | 4/1987 | Nishikawa ............................... | 74/531 |
| 4,913,489 | 4/1990 | Martin ................................. | 248/429 X |
| 5,183,313 | 2/1993 | Cunningham ......................... | 297/344.1 |

*Primary Examiner*—John A. Jeffery
*Assistant Examiner*—Brandon C. Stallman
*Attorney, Agent, or Firm*—Harrison & Egbert

[57] ABSTRACT

A carriage adapted to be slidably mounted on a track comprises a main body having a pair of retaining elements adapted for lateral movement therein. Each turning element is biased inwardly to allow the carriage to be mounted on and removed from a channel formed in the track. A pivotally mounted knife element is adapted to engage each retaining element thereby moving the retaining element outwardly to a position in which they engage the side edges of the channel formed in the track, thereby securing the carriage to the track.

17 Claims, 5 Drawing Sheets

CARRIAGE ADAPTED TO BE SLIDABLY MOUNTED ON A TRACK

TECHNICAL FIELD

THE PRESENT INVENTION RELATES to a carriage adapted to be slidably mounted on a track.

BACKGROUND ART

Tracks are often provided in motor vehicles such as coaches or buses, trains or aircraft for mounting a large number of passenger seats. Typically an individual seat or a row of adjacent seats are secured via legs to a carriage which is then slidably mounted upon a length of track secured to the floor of the vehicle. In this way, a number of seats or rows of seats may be installed along a length of a vehicle such that the spaces between successive seats or rows of seats may be adjusted, thereby varying the "leg room" for passengers. When the seats have been located in their desired position, the carriage may be locked to the track, typically via a spring-biased plunger engaging a recess in the track.

A significant problem with such installations is that the locking mechanism uses relatively small plungers. This presents small engaging surfaces between the plungers and the track, resulting in extremely high local forces in the event that the carriage is urged along the track against the locking mechanism, for instance in an accident. These high local forces can cause damage to the track or carriage due to buckling or breakage.

Another common problem with such installations is that different types of carriage each have an individual locking arrangement making it suitable for use with only a particular configuration of track.

In the event of an accident, it is desirable to provide a locking mechanism which acts as an energy absorber allowing controlled movement of the carriage in relation to the track. This is particularly important when passengers in a vehicle are wearing seat belts, since sudden deceleration, causes each passenger to continue moving, due to inertia, relative to the seat belt which in turn applies considerable pressure to certain parts of the body, thereby increasing the risk of injury.

It is therefore an object of the present invention to provide an improved carriage assembly.

SUMMARY OF THE INVENTION

Accordingly, one aspect of the present invention provides a carriage adapted to be slidably mounted on a track comprising an elongate upwardly open channel formed with at least one longitudinally extending lip, the carriage having a main body with at least one moveable retaining element adapted for lateral movement from a locating position in which the carriage may be freely mounted on and removed from the channel to a securing position in which the or each retaining element is adapted to engage the undersurface of a lip thereby securing the carriage to the track, and securing means adapted to move the or each retaining element outwardly from the locating position to the securing position, the securing means comprising a pivotally mounted elongate element having a free end and adapted for movement from a first position to a second position in which the elongate element engages part of the or each retaining element and moves said retaining element outwardly from said locating position towards the securing position.

Preferably the or each retaining element is substantially elongate in form having a lower flange extending outwardly from below the main body of the carriage, the lower flange being adapted to engage the undersurface of the lip.

Conveniently biasing means is provided to bias the or each retaining element inwardly towards the locating position.

Advantageously the biasing means comprises a spring.

Conveniently the securing means is further adapted to move the or each retaining element outwardly from said locating position to an intermediate retaining position, the retaining position being partway between the locating position and the securing position such that the carriage may be retained upon the track and allowed to slide thereupon.

Advantageously movement of the elongate element from the first position to the second position results in outward movement of the or each retaining element from the locating position to the retaining position.

Conveniently the securing means comprise means to depress the free end of the elongate element when in the second position, thereby moving the or each retaining element outwardly from said retaining position to said securing position.

Preferably the means to depress the free end of the elongate element comprise a lever adapted to engage the free end of the knife element.

Advantageously the lever is adapted to lift the free end of the elongate element.

Conveniently two opposing retaining elements are provided.

Preferably the carriage is provided in connection with a track, the track comprising an elongate channel formed with at least one longitudinally extending lip.

Advantageously the carriage is provided in connection with a track, the track comprising an elongate channel of substantially C-shaped cross-section formed with two opposite inwardly oriented lips.

According to a further aspect of the present invention, there is provided a carriage adapted to be slidably mounted on a track comprising an elongate upwardly open channel formed with at least one longitudinally extending lip, the carriage having a main body with a plurality of rotatable retaining elements located longitudinally therein, and moving means to co-rotate the retaining elements from a locating position in which the carriage may be freely mounted on and removed from the channel to a securing position in which each retaining element is adapted to engage the undersurface of the lip, thereby securing the carriage to the track.

Preferably the moving means comprise a plurality of toothed wheels, each of which is associated with a respective rotatable retaining element and is adapted to engage a toothed rack adapted for linear movement with respect to the main body.

Advantageously each of the rotatable retaining elements comprises a shoe adapted for engagement with the undersurface of the lip.

Conveniently the shoe comprises an upwardly directed cam surface adapted for engagement with the other surface of the lip.

DETAILED DESCRIPTION OF THE PRESENT INVENTION

Figure 1:
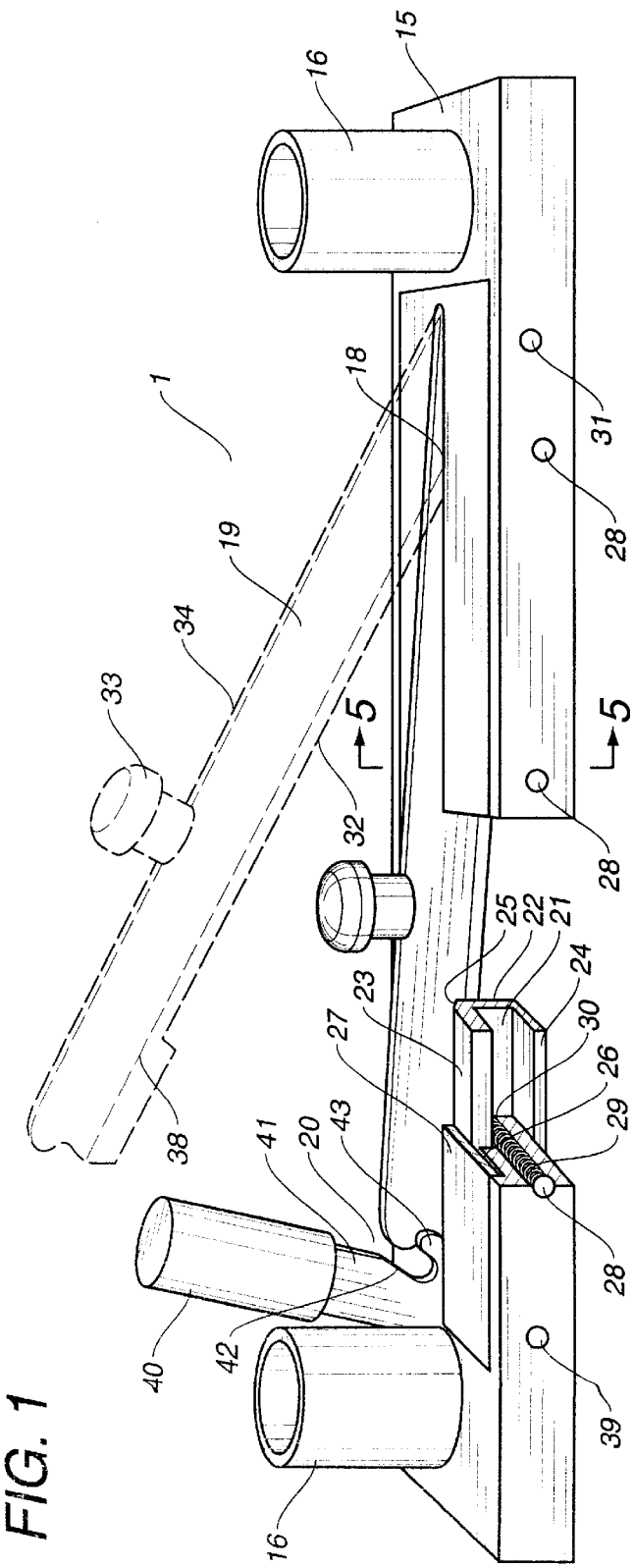
FIG. 1 is a perspective view of a carriage having a section cut away, and showing part of the carriage, illustrated in phantom, in an alternative position.
Figure 2:
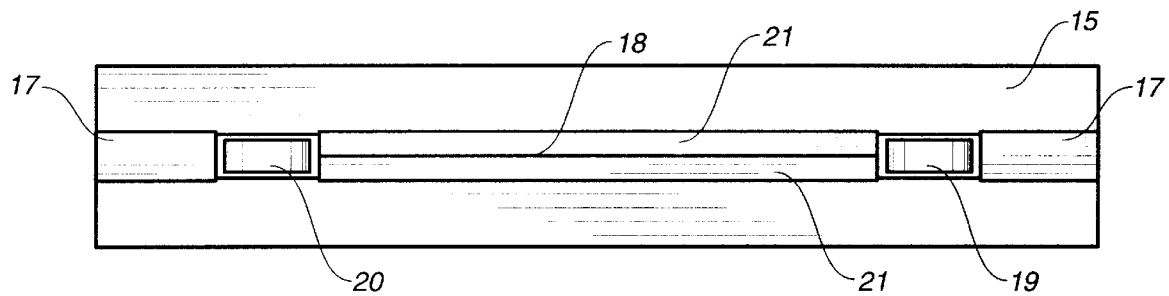
FIG. 2 is a bottom view of the carriage illustrated in FIG. 1.
Figure 3:
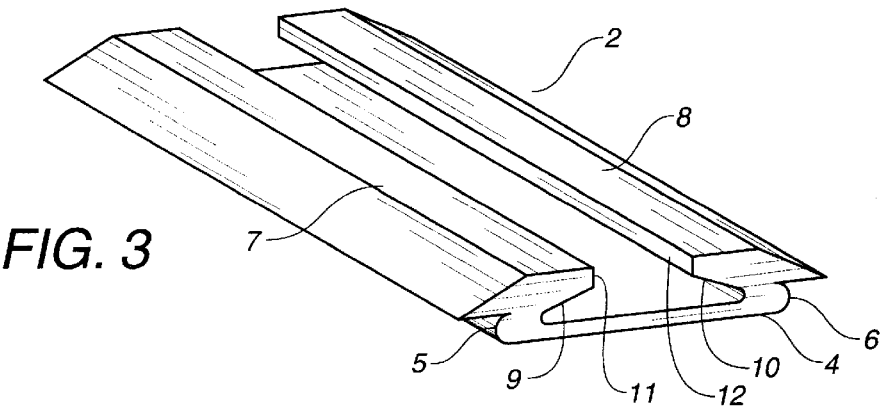
FIG. 3 is a perspective view of a track suitable for use with the carriage illustrated in FIGS. 1 and 2.
Figure 4:
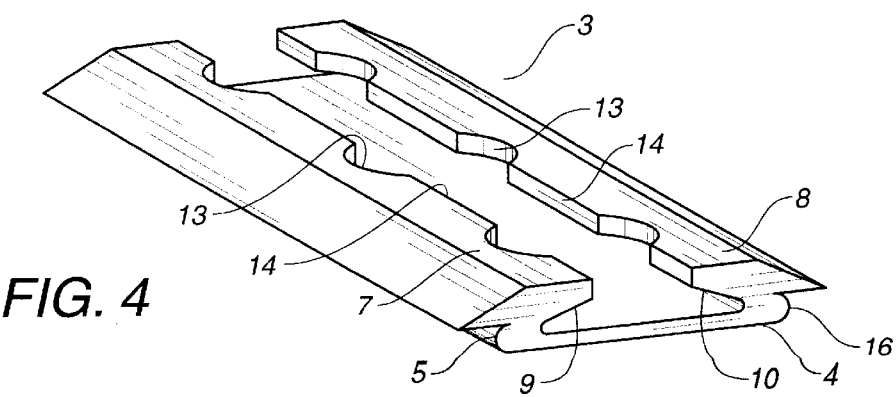
FIG. 4 is a perspective view of another form of track suitable for use with the carriage illustrated in FIGS. 1 and 2.

Referring initially to FIG. 1 and FIG. 2, a carriage 1 is shown which is mountable on a track 2 or 3 as shown in FIGS. 3 and 4 respectively, the track being secured to the floor of a vehicle such as a motor vehicle, a train or an aircraft.

The track 2, as shown in FIG. 3, comprises a single elongate piece of extruded aluminium formed as an upwardly open channel of substantially C-shaped cross-section. The channel is defined by a base plate 4 and two upstanding elongate side walls 5, 6 which terminate at two inwardly facing and opposed lips 7, 8. Each side wall 5, 6 defines an edge of the open channel. Each lip 7, 8 has a respective undersurface 9, 10 and defines a respective linear edge portion 11, 12 which is parallel to the longitudinal axis of the track 2.

The track 3, as shown in FIG. 4, is of substantially similar configuration to that of track 2, the same reference numerals being used for like parts of the track. In this configuration, the lips 7, 8 are provided with a number of arcuate cut-away segments 13 at regular intervals along the length of the track 3. Each cutaway segment 13 on each lip 7, 8 is directly opposite a corresponding arcuate cutaway segment 13 on the opposite lip 8, 7. Each pair of opposing arcuate cutaway segments 13 define a nominal circle. Between neighbouring cutaway segments 13 on each lip 7, 8 there is formed a linear edge portion 14 which is parallel to the longitudinal axis of the track 3 and which links the ends of the neighbouring arcuate cutaway segments 13. The linear edge portions 14 of each lip 7, 8 are co-aligned, the linear portions of the two edges being parallel and spaced apart by a pre-determined distance.

The carriage 1 comprises a substantially rectangular main body 15 having at each end a substantially cylindrical upwardly extending socket 16 adapted to receive the leg of a seat, and a downwardly depending registering lug 17 of substantially rectangular form.

Within main body 15, there is provided an elongate central slot 18 therethrough within which there is received a pivotally mounted knife element 19, a lever 20 and a pair of opposing elongate retaining elements 21. Each retaining element 21 is of C-section having a vertical web 22, a horizontally outwardly extending upper flange 23 and a horizontally outwardly extending lower flange 24. Upper flange 23 is provided with an inwardly facing, inclined engaging surface 25 adapted to engage knife element 19. Each retaining element 21 is received within the main body 15 such that the upper flange 23 is slidably engaged upon an upwardly directed flat surface 26, and web 22 extends downwardly from main body 15 such that lower flange 24 may extend outwardly therefrom. A securing plate 27 is secured to the top of main body 15, thereby loosely retaining each retaining element 21 within the main body, such that each retaining element is capable of limited rotation about a longitudinal axis.

Along the length of main body 15, there is provided a plurality of transverse apertures 28 therein. Within each aperture 28 is a helical spring 29 mounted upon a cylindrical pin 30, such that the outer end of spring 29 is secured to the outer end of pin 30 and the inner end of spring 29 engages web 22 of retaining element 21. In this way, the helical springs 29 serve as biasing means to bias each guide rail inwardly with respect to the main body 15.

Knife element 19 is pivotally mounted upon a transverse shaft 31 at one end of slot 18. Knife element 19 is substantially elongate in form having a lower sharpened edge 32 for engagement with engaging surface 25 of each retaining element 21. Knife element 19 is provided with a knob 33 secured to its upper edge 34. Knife element 19 terminates at a free end 35 with a downwardly curving corner surface 36 and a flat undersurface 37. Also formed at free end 35 of knife element 19 there is an enlargened downwardly depending blade portion 38.

Lever 20 is pivotally mounted about transverse shaft 39 at the opposite end of slot 18. Lever 20 is formed with an upwardly extending handle portion 40 secured thereto. The shank 41 of lever 20 is formed with an inwardly directed cam face 42 and an upwardly projecting protrusion 43 having a substantially arcuate profile.

In operation, the carriage 1 is secured to the legs of a seat via sockets 16. The knife element 19 is then moved upwardly to a position substantially as shown in phantom in FIG. 1, lever 20 also being moved to a substantially vertical position. In this, condition, the biasing springs 29 bias the retaining elements 21 inwardly with respect to main body 15. The carriage 1 may then be lowered onto the track 2 or 3 such that registering lugs 17 are each received within the channel of the t-rack.

Figure 5:
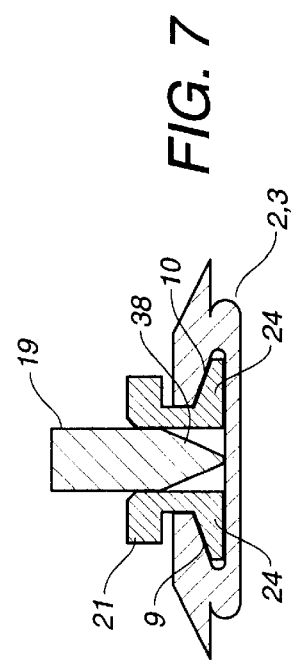
FIG. 5 is a schematic cross-section through the carriage of FIG. 1, along the line I—I, showing the carriage in connection with a track.

Knife element 19 may then be lowered to a position substantially as shown in bold in FIG. 1. In this way, sharpened edge 32 engages the engaging surface 25 of each retaining element 21, and due to the downward motion of knife element 19, forces the retaining elements 21 apart with a limited degree of rotation relative to the main body 15. In this condition, the retaining elements are in a position similar to that illustrated schematically in FIG. 5. The rotational motion is due to the fact that the inwardly biasing force due to springs 29 acts along a line below the point of application of the outward force due to knife element 19, thereby producing a lever effect which causes each retaining element to rotate due to its loose fit within the carriage 1. Each lower web 24 engages the undersurface 9 or 10 of track lips 7 or 8. In this condition, the carriage is retained upon track 2 or 3 such that the carriage is free to slide along the track.

Figure 6:
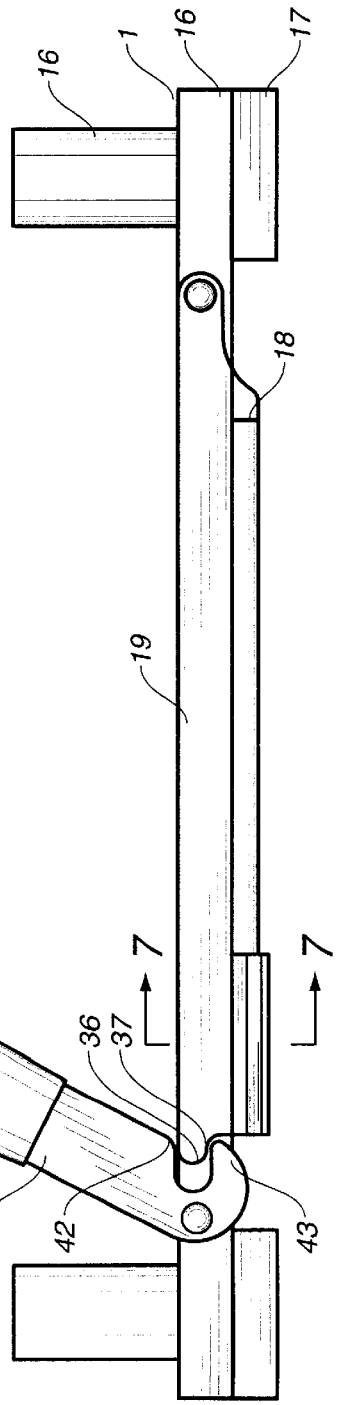
FIG. 6 is a side view of the carriage of FIG. 1, with two parts in alternative positions.
Figure 7:
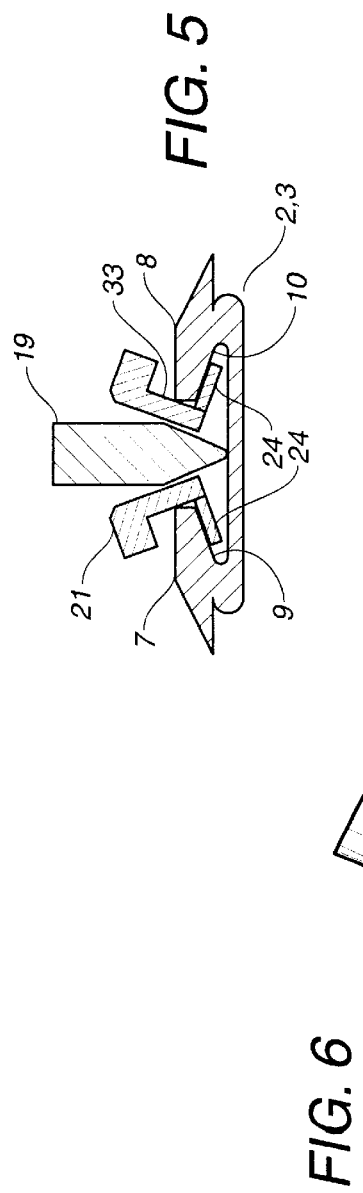
FIG. 7 is a schematic cross-section through the carriage of FIG. 6, along line II—II, showing the carriage in connection with a track.

Once the desired position of the carriage is attained, lever 20 may be depressed such that cam surface 42 engages curved corner surface 36, thereby depressing knife element 19 into the position shown in FIG. 6. This action forces enlargened blade portion 38 downwardly between respective guide rails 21, thereby pushing the guide rails further apart such that they straighten up and assume a position substantially as illustrated in FIG. 7. In this condition the outer edges of lower flanges 24 engage a respective side edge of the channel formed in track 2 or 3 with considerable force, hence locking the carriage via friction, in the pre-determined position along the length of track.

In this condition, due to the elongate form of retaining elements 21, any load then exerted on carriage 1 is spread over a substantial area of the rail 21. Thus the risk of the rail deforming is substantially reduced. However, in the event of the motor vehicle being involved in an accident, the retaining elements permit controlled forward movement of the carriage 1 relative to the track 2 or 3 in response to a predetermined force capable of overcoming the frictional force between each retaining element 21 and the track. Thus, if a substantial force is applied to the occupant of the seat the entire seat may move forward slightly, thus reducing the risk of injury being imparted to the occupant of the seat.

In order to remove the carriage 1 from track 2 or 3, the first step is to lift lever 20 from the position illustrated in FIG. 6 to that illustrated in FIG. 1. This movement causes arcuate protrusion 43 to move upwardly thereby engaging flat undersurface 37 of knife element 19. The upward movement of lever 20 thus lifts the free end 35 of knife element 19, thereby raising enlargened blade portion 38 and permitting retaining elements 21 to assume the position illustrated in FIG. 5, due to the biasing force of springs 29. In this condition, the carriage 1 is again allowed to slide along track 2 or 3 whilst being retained thereupon.

To remove the carriage 1 completely From the track 2 or 3, the knife element 19 must then be lifted, using knob 33 for grip, such that sharpened portion 32 is removed from between respective retaining elements 21. Retaining elements 21 are then forced inwardly under the action of biasing springs 29, such that lower flanges 24 thereof no longer engage the undersurface 9, 10 of track lips 7, 8. The carriage 1 is now free to be lifted from track 2 or 3.

Figure 8:
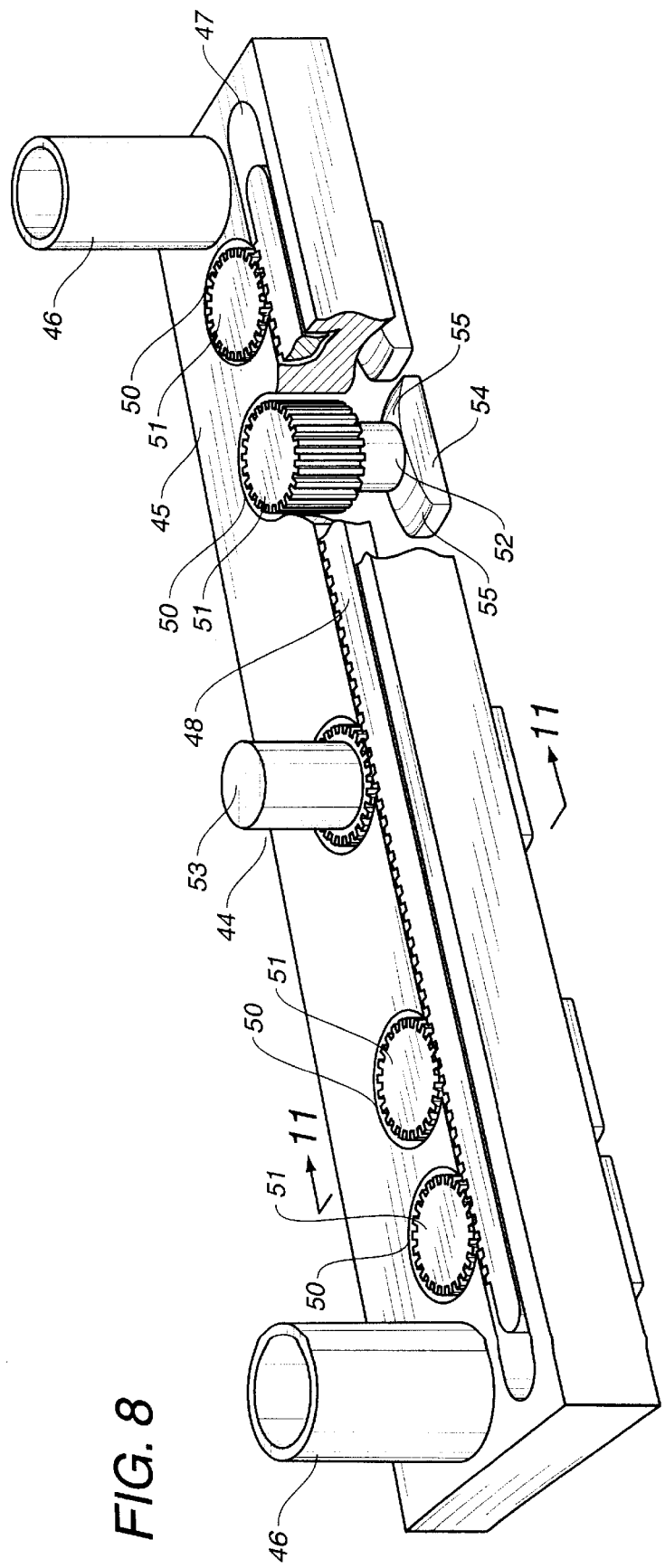
FIG. 8 is a perspective view of a carriage in accordance with the invention having a section cut away.

Turning now to FIG. 8, an alternative embodiment of the present invention is illustrated. A carriage 44 is shown which is mountable on a track 2 or 3 as shown in FIGS. 3 and 4 respectively, the track again being secured to the floor of a vehicle such as a motor vehicle, a train or an aircraft.

The carriage 44 comprises a substantially rectangular main body 45 having at each end a substantially cylindrical upwardly extending socket 46 adapted to receive the leg of a seat.

Within main body 45, there is provide, an upwardly directed elongate recess 47 offset to one side of the longitudinal axis of main body 45. Within recess 47, there is slidably received an elongate rack element 48 having an inwardly directed toothed face 49.

A plurality of substantially cylindrical recesses 50 are formed in the upper surface of main body 45, substantially centrally therein, each recess 50 communicating with elongate recess 47.

Within each recess 50, there is provided a toothed wheel 51, each of which engages the rack element 48 and is journalled to a substantially vertical shaft 52 passing through an aperture at the bottom of each recess 50. At least one of said toothed wheels 51 is provided with an upwardly extending knob 53.

Each vertical shaft 52 extends downwardly through the main body 45 and terminates with a shoe arrangement 54 having a pair of opposed radially outwardly extending cam surfaces 55. The shoe arrangement 54 is adapted for engagement within the channel of track 2 or 3.

In operation, the carriage 44 is secured to the legs of a seat via socket 46. The knob 53 is then turned such that each wheel 51 assumes a position in which its associated shoe 54 is aligned with the axis of main body 45. The carriage 44 may then be lowered onto the track 2 or 3 such that each shoe 54 is received within the channel of the track.

Figure 10:
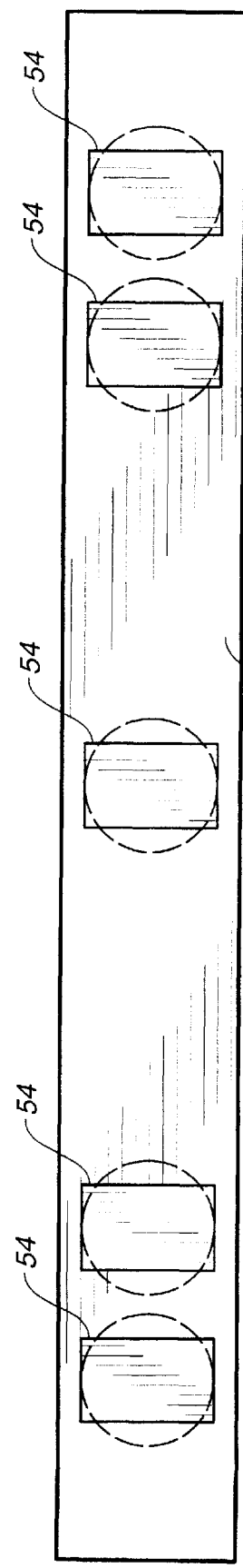
FIG. 10 is a schematic plan view of the carriage illustrated in FIG. 9, showing some parts in an alternative position.
Figure 11:
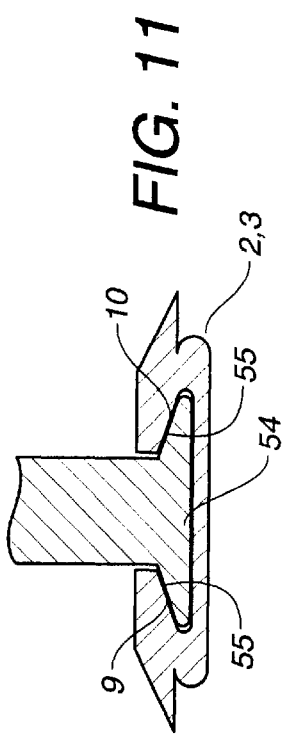
FIG. 11 is a schematic cross-section through the carriage of FIG. 8, along line III—III showing the carriage in connection with a track.

Knob 53 may then be turned through approximately 90°, such that its associated wheel 51 also rotates through 90°, thereby causing the rack 48 to slide longitudinally within recess 47 and thus rotate each other wheel 51 through 90°. In this condition, each shoe arrangement 54 assumes a position substantially as illustrated in FIG. 10, such that each shoe lies perpendicular to the axis of main body 45. This position is shown schematically in FIG. 11. Upwardly directed cam faces 55 of shoe 54 engage respective undersurfaces 9, 10 thereby locking the carriage in position with respect to the track.

Figure 9:
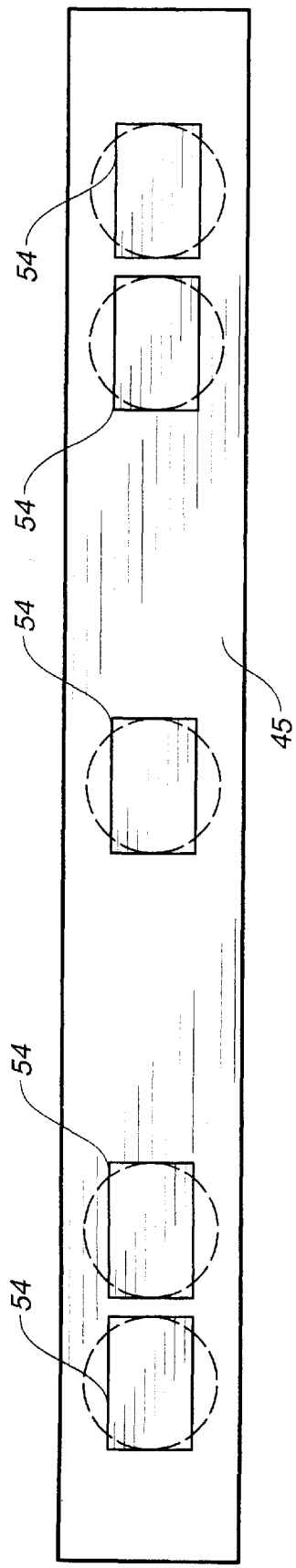
FIG. 9 is a schematic plan view of the carriage illustrated in FIG. 8.

In order to remove the carriage 44 from track 2 or 3, the knob 53 must be rotated through 90°, thereby moving the rack 48 and turning associated wheels 51 through 90°, thereby returning each shoe 54 to its longitudinally aligned position illustrated in FIG. 9. In this condition, the carriage 44 is free to be lifted from track 2 or 3.

While the present invention has been described with reference to carriages 1, 44 carrying sockets 16,46 for attachment to the legs of a seat, it is to be appreciated that alternative fixing means may be used. For instance, it is also envisaged that loops, rings or shackles may be secured to the carriage 1 to engage straps or ropes which can be used to lash and restrain heavy objects within a vehicle. The foregoing disclosure and description of the invention is illustrative and explanatory thereof. Various changes in the details of the illustrated construction may be made without departing from the true spirit of the invention. The present invention should only be limited by the following claims and their legal equivalents.

I claim:

1. A carriage adapted to be slidably mounted on a track comprising an elongate upwardly open channel formed with at least one longitudinally extending lip, the carriage having a main body with at least one moveable retaining element adapted for lateral movement from a locating position in which the carriage may be freely mounted on and removed from said channel to a securing position in which the retaining element is adapted to engage the undersurface of said lip thereby securing the carriage to the track, and securing means adapted to move the retaining element outwardly from said locating position to said securing position, said securing means comprising a pivotally mounted elongate element having a free end and adapted for movement from a first position to a second position in which the elongate element engages part of the retaining element and moves said retaining element outwardly from said locating position towards said securing position.

2. A carriage according to claim 1, wherein the retaining element is substantially elongate in form having a lower flange extending outwardly from below the main body of the carriage, said lower flange being adapted to engage the undersurface of said lip.

3. A carriage according to claim 1, wherein biasing means is provided to bias the retaining element inwardly towards said locating position.

4. A carriage according to claim 3, wherein said biasing means comprises a spring.

5. A carriage according to claim 1, wherein said securing means is further adapted to move the retaining element outwardly from said locating position to an intermediate retaining position, said retaining position being partway between said locating position and said securing position such that the carriage may be retained upon said track and allowed to slide thereupon.

6. A carriage according to claim 5, wherein movement of said elongate element from said first position to said second position results in outward movement of the retaining element from said locating position to said retaining position.

7. A carriage according to claim 6, wherein said securing means comprise means to depress the free end of said elongate element when in said second position, thereby moving the retaining element outwardly from said retaining position to said securing position.

8. A carriage according to claim 7 wherein said means to depress the free end of said elongate element comprise a lever adapted to engage the free end of said elongate element.

9. A carriage according to claim 8, wherein said lever is adapted to lift the free end of said elongate element.

10. A carriage according to claim 1, wherein two opposing retaining elements are provided.

11. A carriage according to claim 1 in combination with a track, the track comprising an elongate channel formed with at least one longitudinally extending lip.

12. A carriage in combination with a track according to claim 11, wherein the track comprises an elongate channel of substantially C-shaped cross-section formed with two opposite inwardly oriented lips.

13. A carriage adapted to be slidably mounted on a track comprising an elongate upwardly open channel formed with at least one longitudinally extending lip, the carriage comprising a main body with a plurality of rotatable retaining elements located longitudinally therein, and a moving means to simultaneously rotate said plurality of rotatable retaining elements from a locating position in which the carriage is freely mounted on and removed from said channel to a securing position in which each retaining element engages fixedly an undersurface of said lip to secure the carriage to the track, said moving means comprising a pivotally mounted elongate element having a free end and adapted for movement from a first position to a second position, said first position being separated from said plurality of rotatable retaining elements such that said plurality of rotatable retaining elements are in said locating position, said elongate element engaging said plurality of rotatable retaining elements so as to move said plurality of rotatable retaining elements outwardly to said securing position.

14. A carriage according to claim 13, wherein each of said rotatable retaining elements comprises a shoe adapted for engagement with the undersurface of said lip.

15. A carriage according to claim 14, wherein said shoe comprises an upwardly directed cam surface adapted for engagement with the other surface of said lip.

16. A carriage according to claims 13 in connection with a track, the track comprising an elongate channel formed with at least one longitudinally extending lip.

17. A carriage in combination with a track according to claim 16, wherein the track comprises an elongate channel of substantially C-shaped cross-section formed with two opposite inwardly oriented lips.

* * * * *